United States Patent
Banerjee et al.

(10) Patent No.: US 11,449,320 B2
(45) Date of Patent: Sep. 20, 2022

(54) MECHANISM FOR DEPLOYING LEGACY APPLICATIONS ON NEW GENERATION HYPERSCALERS

(71) Applicant: SAP SE, Walldorf (DE)

(72) Inventors: Rick Banerjee, Bangalore (IN); Himanshu Joshi, Bangalore (IN); Sujith Henamagalur Dinakar, Bangalore (IN)

(73) Assignee: SAP SE, Walldorf (DE)

( * ) Notice: Subject to any disclaimer, the term of this patent is extended or adjusted under 35 U.S.C. 154(b) by 131 days.

(21) Appl. No.: 16/877,434

(22) Filed: May 18, 2020

(65) Prior Publication Data

US 2021/0311709 A1    Oct. 7, 2021

(30) Foreign Application Priority Data

Apr. 3, 2020    (IN) .............................. 202011014816

(51) Int. Cl.
| | |
|---|---|
| G06F 9/44 | (2018.01) |
| G06F 8/60 | (2018.01) |
| H04L 41/50 | (2022.01) |
| G06F 16/25 | (2019.01) |
| G06F 8/41 | (2018.01) |

(52) U.S. Cl.
CPC .................. G06F 8/60 (2013.01); G06F 8/41 (2013.01); G06F 16/252 (2019.01); H04L 41/5096 (2013.01)

(58) Field of Classification Search
CPC . G06F 8/60; G06F 16/252; G06F 8/41; H04L 41/5096
See application file for complete search history.

(56) References Cited

U.S. PATENT DOCUMENTS

| | | | |
|---|---|---|---|
| 2009/0113382 A1* | 4/2009 | Chancey | G06F 8/71 717/104 |
| 2010/0023521 A1* | 1/2010 | Arcese | G06F 16/2343 707/E17.007 |
| 2016/0019096 A1* | 1/2016 | Winterfeldt | G06F 9/5066 717/177 |
| 2017/0052772 A1* | 2/2017 | Chen | G06F 9/45558 |
| 2021/0112141 A1* | 4/2021 | Honnavalli | H04L 41/5019 |

* cited by examiner

*Primary Examiner* — Hang Pan
(74) *Attorney, Agent, or Firm* — Mintz Levin Cohn Ferris Glovsky and Popeo, P.C.

(57) ABSTRACT

In some implementations, there is provided a method including determining whether a topology description includes a static physical host name and a static port address; in response to determining the topology description includes the static physical host name and the static port address, converting at least the topology description into a deployment file; including, in a container, the deployment file, code, and a control script that limits pre-start database operations to a single node of a plurality of nodes of a cloud platform; and deploying, the container including the deployment file, the code, and the control script, to the cloud platform to form, at the cloud platform, the plurality of nodes including the single node. Related systems and articles of manufacture are also disclosed.

17 Claims, 6 Drawing Sheets

MECHANISM FOR DEPLOYING LEGACY APPLICATIONS ON NEW GENERATION HYPERSCALERS

CROSS-REFERENCE TO RELATED APPLICATION

The present application claims priority to Indian Provisional Patent Appl. No. 202011014816, filed Apr. 3, 2020, and entitled "MECHANISM FOR DEPLOYING LEGACY APPLICATIONS ON NEW GENERATION HYPERSCALERS," and incorporates its disclosure herein by reference in its entirety.

TECHNICAL FIELD

This disclosure relates generally to deploying applications to cloud based systems.

BACKGROUND

Data centers and, in particular, cloud based platforms including public and private clouds may be configured to provide hyperscale technology. Hyperscale allows the data center to scale resources on demand. For example, an application may be provided as a service via a cloud platform. When this is the case, the hyperscale technology may enable dynamically adding resources, such as memory, processor, network, and persistent storage to one or more nodes of the cloud platform.

SUMMARY

In some implementations, there is provided a method including determining whether a topology description includes a static physical host name and a static port address; in response to determining the topology description includes the static physical host name and the static port address, converting at least the topology description into a deployment file; including, in a container, the deployment file, code, and a control script that limits pre-start database operations to a single node of a plurality of nodes of a cloud platform; and deploying, the container including the deployment file, the code, and the control script, to the cloud platform to form, at the cloud platform, the plurality of nodes including the single node.

In some variations, one or more of the features disclosed herein including the following features can optionally be included in any feasible combination. The determining may further include determining whether the cloud platform uses a hyperscaler and deployment orchestrator that do not allow the use of the static physical host name, the static port address, and customized code into only one node of the plurality of nodes. In response to determining the cloud platform does allow the use of the static physical host name, the static port address, and the customized code, the code and the topology description may be deployed directly to the cloud platform. In response to determining the cloud platform does allow the use of the static physical host name, the static port address, and the customized code, the converting and the including may be by-passed. The control script may include a lock and key process to limit the pre-start database operations to the single node of the plurality of nodes. The deployment file may be configured to be deployed by a deployment orchestrator associated with the cloud platform. The deployment file may describe a deployment architecture of a service at the cloud platform. The deployment file may include one or more roles for each of the plurality of nodes. At least one of the plurality of roles may provide a user interface for accessing a database management system, while at least one of the plurality of roles may provide the database management system. The deployment file may include node names for the plurality of nodes to enable a service mesh to provide communications among the plurality of nodes.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
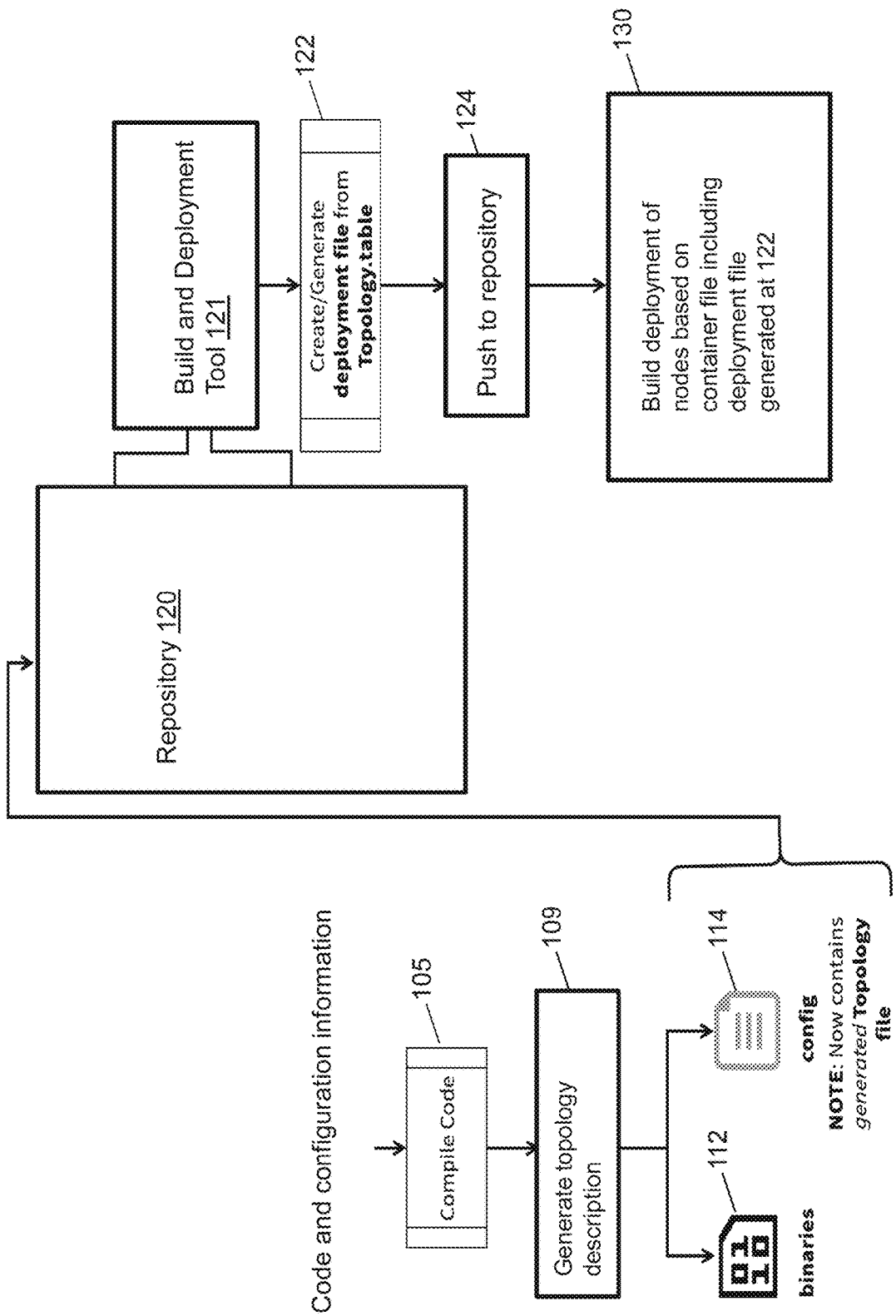
FIG. 1 illustrates an example of a deployment process, in accordance with some implementations of the current subject matter.

Some multitenant, software-as-a-service (SaaS) applications may be deployed using a collection of customized scripts, which may be developed over time as releases and/or updates are deployed. As such, the deployment framework may be considered highly customized to the needs of the specific, legacy application (also referred to as a "service") being deployed. And, the application may often be hosted at a data center, such as on a private cloud (e.g., a data center controlled by the entity that also operates the service). This paradigm can work until (i) there is a need for a rapid expansion into new regions, (ii) the capacity of the existing data center is reached, and/or (iii) there is a need to grow the number of end-user's accessing the service.

To address the need for hyperscaling and its associated ability to rapidly expand, cloud platforms, such as public cloud platforms (e.g., AWS, Azure, or Google Cloud Platform), can be used alone or in combination with a private cloud platform. However, the shift to the public cloud platforms also has issues. For example, the customized deployment scripts may not work well with the newer and disparate deployment technologies being used by some of the public cloud platforms. To illustrate for example, certain cloud technologies, such as containers (which refers to the delivery of software in packages isolated from one another and bundled to include their own software, libraries, and configuration files) and internode communications, may not operate seamlessly and properly across different cloud platforms. For example, a Docker container image is an executable package of software having code, runtime, system tools, system libraries and settings need to run an application. The container images become containers at runtime. Other examples of containers (also referred to as cloud containers) include Amazon Elastic Container Service, AWS Fargate, Google Kubernetes Engine, Microsoft Azure Container Instances, Azure Kubernetes Service, and IBM Cloud Kubernetes Service.

To deploy a service (e.g., an application) to a cluster of one or more nodes at a data center, the process may include providing a topology description. This topology description may specify (i) the number and kind of nodes that form the cluster, (ii) the specific physical host name(s) on which these nodes of the cluster are hosted, and (iii) the identity of ports used by the nodes for listening or sending data (so there are no port clashes when several nodes run on a single host, for example). For example, one or more first nodes may correspond to user interfaces that access one or more other nodes corresponding to a database base management system. In the case of the service being a database management system, build-to-build migrations may be handled using custom code to upgrade the database management system to a database schema needed by a new build. For example, customized code may be deployed to a specific node of the cluster to perform pre-start database schema changes before the other nodes of the cluster start.

Table 1 depicts an example of a portion of a topology description. In the example of Table 1, code (which is for the application being deployed) and the topology description may be deployed to one or more of the nodes of the cluster to start the application at the one or more nodes.

In the example of Table 1, there are two nodes, "TaskCXML110002" and "UI110000." Both nodes are on the same physical host, which has a static, physical host name of "buildbox278.ariba.com." This first node ("TaskCXML110002") has the role of a task node (see, e.g., AribaTaskRunner) that runs background and other scheduled tasks. And, the topology description statically defines the port addresses (e.g., udpPort=18002 and httpsPort=28002), and the physical name for the node is defined as TaskCXML110002. The group (e.g., 0=20002; 1=22002) captures configuration information for multicast communications among application nodes, such as a user data protocol (UDP) multicast among application nodes. The second node, UI110000, has a role of providing a user interface (see, e.g., AribaUI) and is defined to have static, port addresses, such as udpPort=18000 and httpsPort=28000. Although Table 1 only depicts 2 nodes, the topology description may include additional nodes as well.

With the topology description at Table 1, the number of nodes are then created and a custom script is provided (based on the physical hostname and port address information included in the topology description) into each node via a secure shell or other communication mechanism. Each node may then start per its specific role as defined in topology description. Although this deployment methodology may operate in some systems, this process may not be operative in some cloud platforms that include for example a hyperscaler. A container orchestrator (which runs on the hyperscaler) may be used to deploy containers to form the nodes. The orchestrator manages hosts and containers in an elastic, dynamic way, rather than in the static manner depicted at Table 1.

TABLE 1

```
TaskCXML110002 = {
    host = buildbox278.ariba.com;
    groups = { 0 = 20002;1 = 22002;} ;
    udpPort = 18002;
    httpsPort = 28002;
    roles = ( AribaTaskRunner ) ;
    physicalName = TaskCXML110002;
};
UI110000 = {
    host = buildbox278.ariba.com;
    udpPort = 18000;
    httpsPort = 28000;
    roles = ( AribaUI ) ;
    physicalName = UI110000;
};
```

FIG. 1 depicts an example of a process for deploying a service (e.g., an application) to a cloud platform, in accordance with some example embodiments.

At 105, the code and associated configuration information is received, and then the received code is compiled. The complied code corresponds to the application that is being deployed to the cloud platform, so that the one or more nodes can each provide the application (or service) via the cloud platform. As noted, the application may be hosted on one or more physical machines of a data center, such as a public cloud platform, private cloud platform, and the like.

After the code is compiled, a topology description is generated at 109. The compiled code 112 and generated topology description 114 may be operative to instantiate nodes at some cloud platforms but some cloud platforms that use hyperscalers and deployment orchestrators may not allow the use of static host naming, static addresses, and/or deploying customized code directly into a single node. In some embodiments, a check is performed to determine whether the compiled code 112 and generated topology description 114 is being deployed to a cloud platform that uses hyperscalers and deployment orchestrators (which do not allow the use of static host naming, static addresses, and/or deploying customized code directly into a single node). If the compiled code 112 and generated topology description 114 are not being deployed to such a cloud platform, the compiled code 112 and generated topology description 114 can be deployed. If, however, the compiled code 112 and generated topology description 114 is being deployed to such a cloud platform, the compiled code 112 and generated topology description 114 may be further processed to convert the compiled code 112 and generated topology description 114 into a deployment file as shown at FIG. 1. To that end, the compiled code 112 and generated topology description file 114 may be stored in a repository 120, which may include other files, objects, and/or scripts being deployed to the cloud platform.

A build and development tool 121 may access the compiled code 112 and generated topology description file 114. At 122, the tool 121 may generate the deployment file based on the compiled code 112 and generated topology description 114. The generated deployment file describes the deployment architecture of the application. And, the generated deployment file may be compatible with containers that can be deployed at any node within the cloud platform, so static naming of physical hosts and static addresses are not used, for example. The deployment file may be deployed to form multiple nodes, each with a defined role, for example. Table 2 below depicts a portion of the deployment file that has been generated, at 122, in accordance with some embodiments.

At 124, the tool 121 may push the generated deployment file to a repository, such as repository 120, of software objects, libraries, packages, artifacts, and the like. The repository may provide versioning of what is stored and can be accessed on demand using a URL over HTTP, for example.

At 130, the container including the generated deployment file is deployed to the cloud. This may include creating running instances of the software to form a cluster of one or more nodes spread across multiple virtual machines at one or more physical hosts. For example, the orchestrator (also referred to as an orchestration and deployment system) may deploy containers (or, e.g., container images) including the generated deployment file to form one or more nodes at runtime. The nodes may be deployed to the same physical host or to a plurality of different physical hosts.

At Table 2, the deployment file combines the nodes and roles that are needed to start the application (while retaining the semantics as they existed at 112 and 114), and enable generation of containers which can be used by orchestration frameworks.

In the example of Table 2, the deployment file includes code and topology information for each node of the cluster. For the first node, the deployment file provides the code being deployed (see, e.g., 'Image': 'S4/Buyer code path'), script commands to be executed at start by the first node (see, e.g., 'Commands': {'CMD1': 'Add folder', 'CMD2': 'wget http://<some_path_on_web>''CMD3': 'Run Script')), resources allocated to the node (see, e.g., 'resources': {'cpu': 8000 #MHz, 'memory':3560 #MB}, the role of the node (see, e.g., 'Task'), port names (which are marked as do not care, "xxxx"), and the node name (see, e.g., TaskCXML110002). For the second node, the deployment file provides the code being deployed (see, e.g., 'Image': 'S4/Buyer code path'), script commands to be executed by the second node (see, e.g., 'Commands': {'CMD1': 'Add folder', 'CMD2': 'wget http://<some_path_on_web>' 'CMD3': 'Run Script')), resources allocated to the second node (see, e.g., 'resources': {'cpu': 8000 #MHz, 'memory': 3560 #MB}, the role of the second node (see, e.g., 'UI'), port names (which are marked as do not care, "xxxx"), and the second node name (see, e.g., UI110000).

In some cloud platforms including the public cloud platform (which may depend on a third party system of orchestration and service discovery system within the cloud platform), there may be very limited (if any) mechanism to control a specific process at an individual node due to for example all nodes being deployed with the same container by the orchestrator of the cloud platform. The orchestrator may automatically deploy, scale, and operate containers among clusters nodes of host(s).

In some embodiments, a control script may be provided to control other nodes so that the other nodes know they need to wait until a first node in the cluster of nodes has finished a pre-start operation, such as a database initialization and modification task. This control script may be included in the deployment file (see, e.g., Table 2) and then provided as part of the container file deployed by orchestrator to each of the nodes.

For example, the first node may, as part of the database initialization and modification task, modify the schema of the database by, for example, adding new tables, columns, and indexes to an existing database schema or performing other database initialization, prestart, or other operations that should be executed only once at start time. Since the pre-start script is bundled with every container and each container runs a series of commands (or a script) to start the container, each container (or node) might attempt to run the pre-start scripts. This would clearly be problematic if a plurality of nodes each attempted to modify the schema of the database, for example. In accordance with some embodiments, the container file may include the control script configured to allow only a single node, such as a first node, to execute these pre-start database operations.

TABLE 2

```
"Cluster" : {
    "TaskCXML110002" : {
        'Image' : 'S4/Buyer code path',
        'Commands' : {
            'CMD1': 'Add folder',
            'CMD2': 'wget http://<some_path_on_web>'
            'CMD3': 'Run Script'
        }
        'resources' : {
            'cpu' : 8000 #MHz
            'memory' : 3560 #MB
        }
        'env': {
            'Role': 'Task'
            'udpPort': xxxx,
            'httpsPort': xxxx,
            'Node_Name': TaskCXML110002
        }
    }
    "UI110000" : {
        'Image' : 'S4/Buyer code path',
        'Commands' : {
            'CMD1': 'Add folder',
            'CMD2': 'wget http://<some_path_on_web>'
            'CMD3': 'Run Script'
        }
        'resources' : {
            'cpu>' : 8000 #MHz
            'memory' : 3560 #MB
        }
        'env' : {
            'Role' : 'UI'
            'udpPort': xxxx,
            'httpsPort': xxxx,
            'Node_Name': UI110000
        }
    }
}
```

Figure 2:
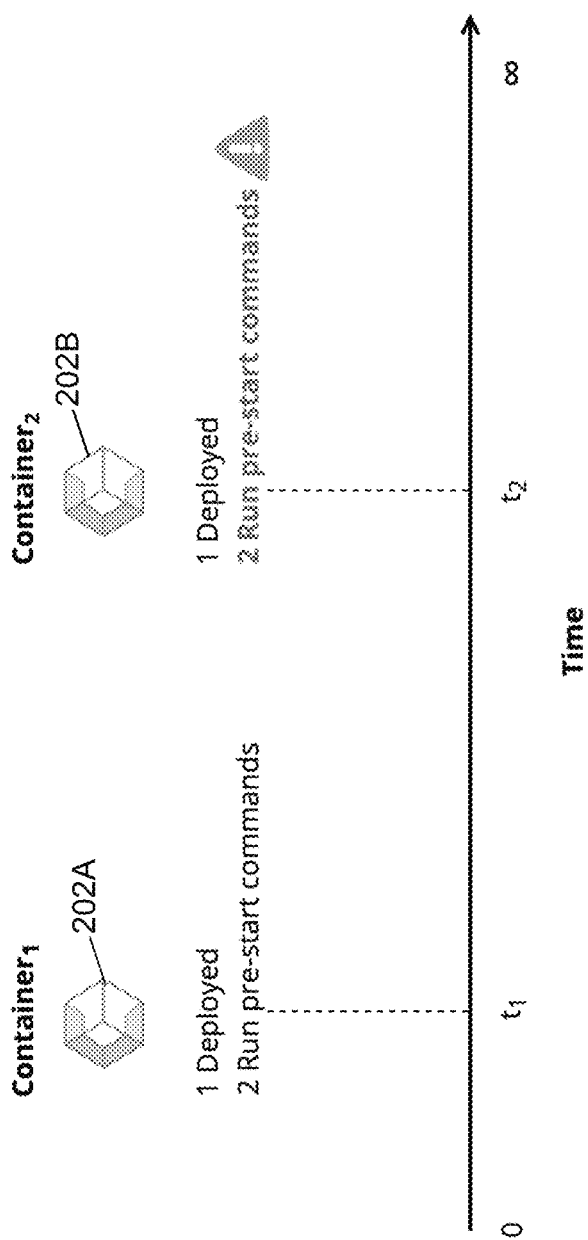
FIG. 2 illustrates an example use of a control script, in accordance with some implementations of the current subject matter.

FIG. 2 depicts an example implementation of the control script, in accordance with some embodiments. As noted, each container 202A-B (each of which is deployed to form a node providing an application/service) may include the same code. To prevent all of the containers 202A-B from each executing the same pre-start database initialization and modification tasks, the control script at container 202A is deployed and run at time $t_1$. When the second container 202B attempts to run the control script, the second container 202B determines that it was not the first node to do run the control script, so the second container 202B does not attempt to re-run the pre-start database initialization and modification tasks of the control script. The second container may know that the first container already ran the control script based on a distributed lock (e.g., the second container can check the state of the lock to determine if lock is taken by the first container in order to execute the control script). Alternatively, a consensus algorithm (e.g., Paxos, Raft, Chandra-Toueg) may be used to pick the first container as a lead container tasked to perform the control script task.

Figure 3:
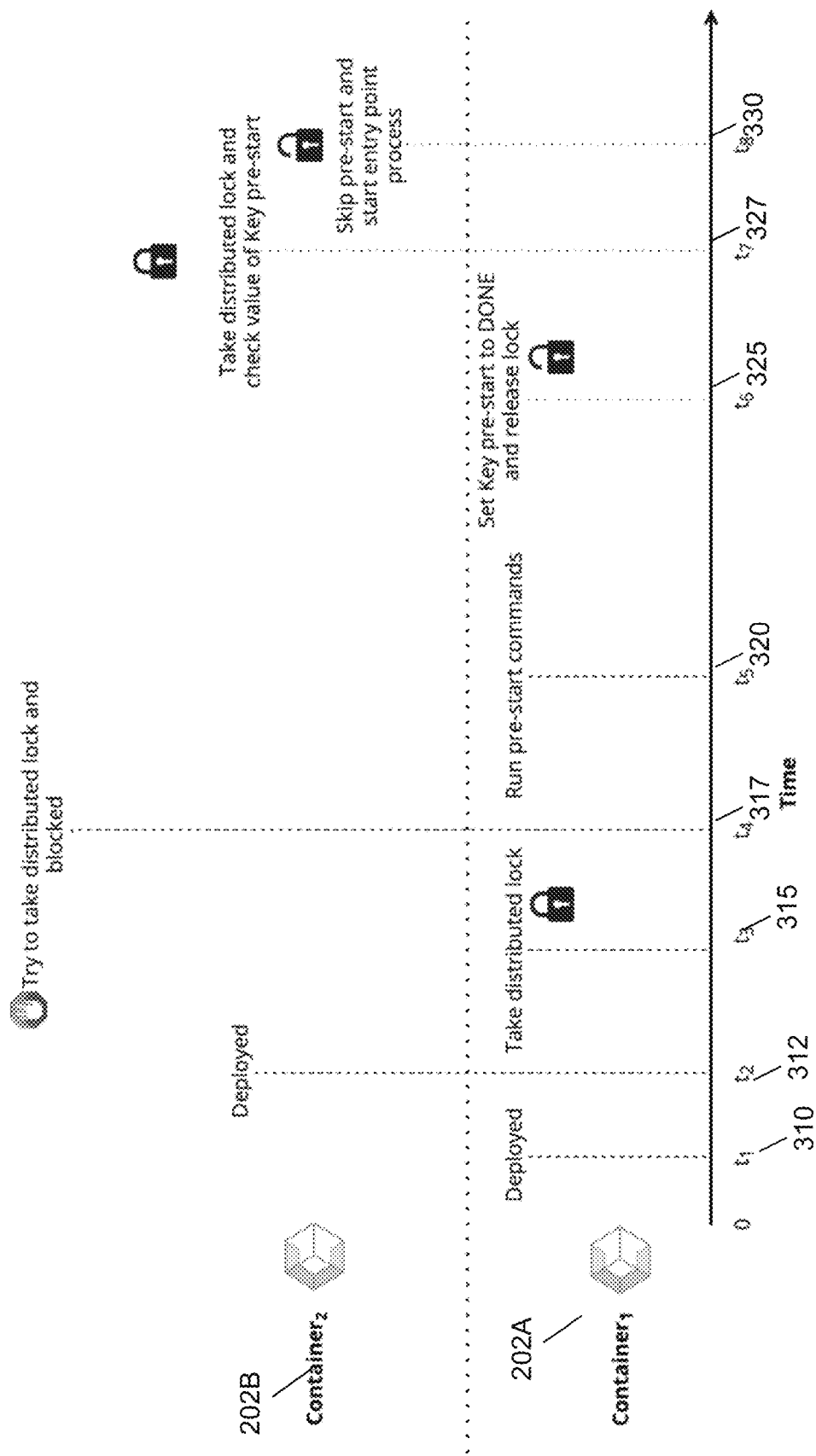
FIG. 3 illustrates an example use of a key and lock process, in accordance with some implementations of the current subject matter.

In some embodiments, the distributed lock may be used in addition to, or as an alternative to, the control script mechanism described above with respect to FIG. 2. FIG. 3 depicts an example of controlling the pre-start database initialization and modification tasks based on a distributed lock, such as a lock and a key value.

Referring to FIG. 3, the container$_1$ 202A is deployed first at time $t_1$ 310. After some time, the container$_2$ 202B is deployed at time $t_2$ 312. Meanwhile, the container$_1$ takes the key (in other words implements a lock) at 315 and begins to run, at 320, one or more pre-start commands, such as the above-noted pre-start database initialization and modification task included in the control script, for example. At 317, the container$_2$ tries to take the key (or lock) but cannot, so the container$_2$ waits. After the container$_1$ finishes running the pre-start scripts (or decides to return the key or release the lock), the container$_1$ releases the lock of the key at 325. At 325, the container$_1$ may also set the value of the key to "done." This key value of "done" allows other containers including container$_2$ to determine that the pre-start process is complete, so the other containers know that the pre-start scripts do not need to be re-executed by another container.

At 327, the container$_2$ may take the key, and may then check the value of the key and determine that the key's value is "done." As such, the container$_2$ determines, at 330, it does not need to do any of the pre-start process, so container$_2$ releases the key and continues to start up without performing the pre-start database operations. If the key's value is not set to "done," the container$_2$ determines, at 330, it does need to do the pre-start database operations.

In some cloud platforms including public cloud systems, the orchestrator may not use, as noted, fixed host names and fixed port addresses to define the topology. Instead, the orchestrator may generate its own deployment file including configuration information to find out which nodes are deployed and discoverable on the cloud system. This deployment file may be deployed to a plurality of nodes as part of the hyperscaling at the cloud platform. An example of a portion of this deployment file including configuration information is depicted at Table 3 below.

TABLE 3

```
"Cluster" : {
  "Node-1" : {
    'Commands': {
      'CMD1': 'Add folder',
      'CMD2': 'wget http:/<some_path_on_web>'
      'CMD3': 'Run Script'
    }
    'resources': {
      'cpu' : 8000 #MHz
```

TABLE 3-continued

```
      'memory' : 3560 #MB
    }
  }
  "Node-2" : {
    'Commands': {
      'CMD1': 'Add folder',
      'CMD2': 'wget http:/<some_path_on_web>'
      'CMD3': 'Run Script'
    }
    'resources' : {
      'cpu' : 8000 #MHz
      'memory' : 3560 #MB
    }
  }
}
```

Figure 4:
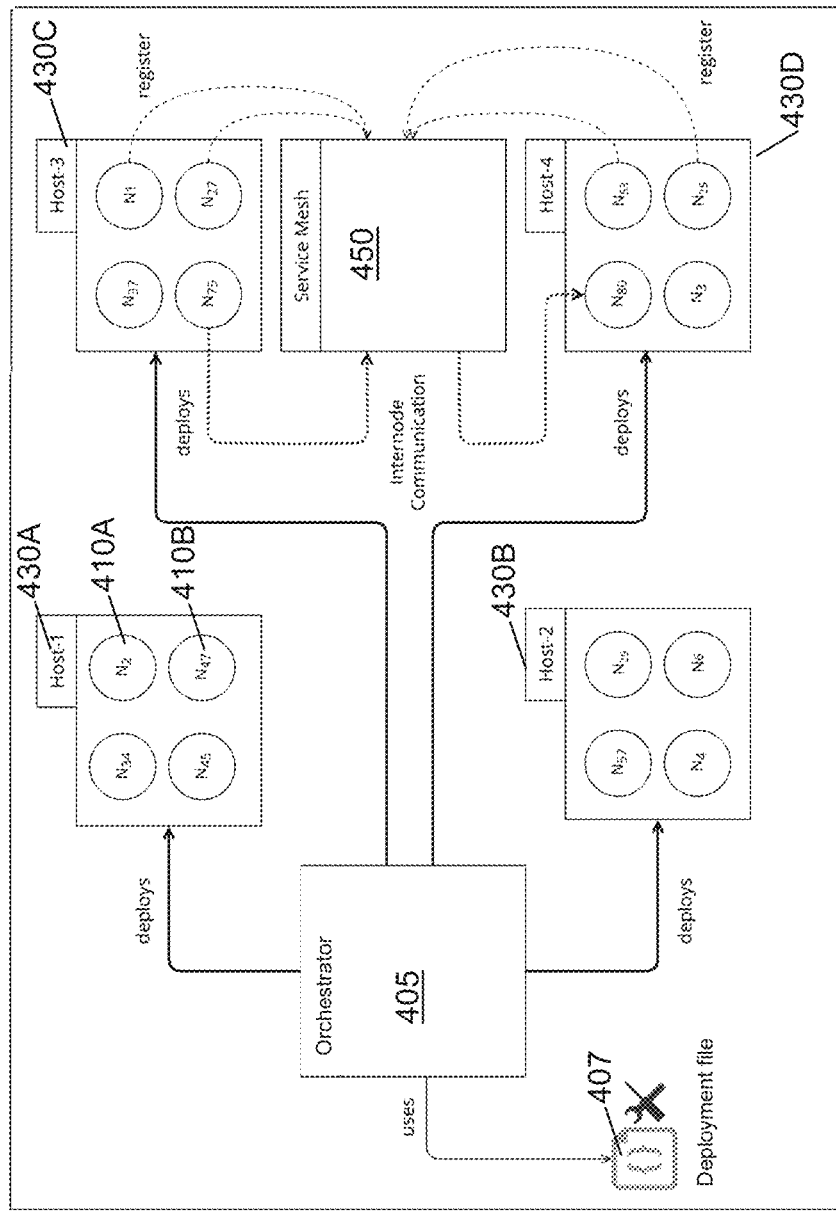
FIG. 4 illustrates an example of a service mesh, in accordance with some implementations of the current subject matter.

Rather than using the actual, physical host names, the deployment file uses service node names, such as "UI110000" (Table 2) and "Node −1" (Table 3). As such, UDP communication between nodes may be performed via a service mesh system (rather than rely on static, physical host names and addresses). FIG. 4 depicts an example of a system 400 including an orchestrator 405 configured to use the deployment file 407 to deploy nodes, such as $N_2$ 410A, $N_{47}$ 410B, and so forth to one or more physical hosts 430A-D. The system 400 further includes a service mesh 450 to provide communications between or among nodes. The service mesh allows nodes to register, and once registered the nodes can communicate with other nodes via the service mesh. The service mesh takes the logic governing node-to-node communication out of the node and abstracts it to the service mesh, which effectively acts a proxy.

Figure 5:
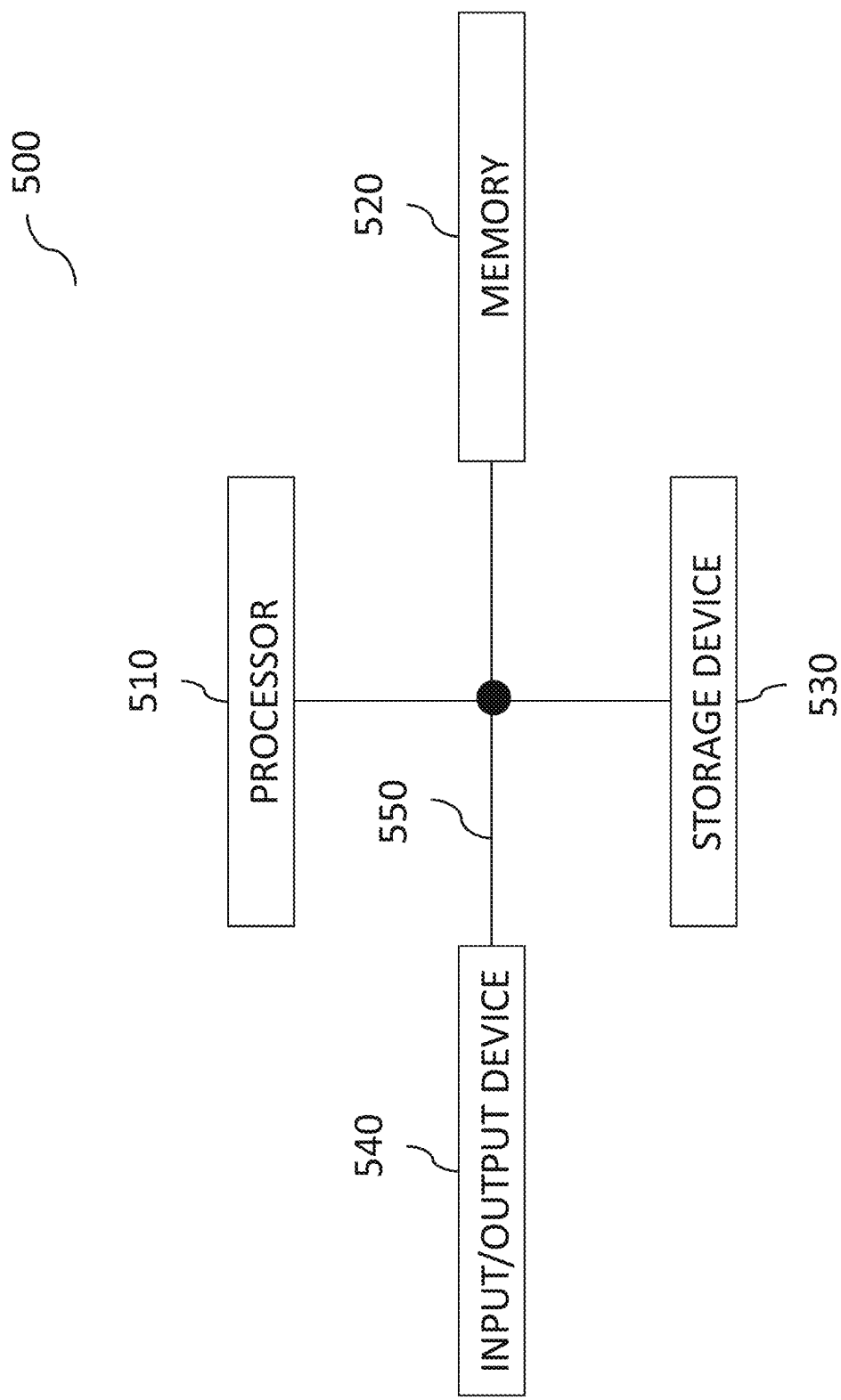
FIG. 5 is an example of a system, in accordance with some implementations of the current subject matter.

In some implementations, the current subject matter can be configured to be implemented in a system 500, as shown in FIG. 5. The system 500 can include a processor 510, a memory 520, a storage device 530, and an input/output device 540. Each of the components 510, 520, 530 and 540 can be interconnected using a system bus 550. The processor 510 can be configured to process instructions for execution within the system 500. In some implementations, the processor 510 can be a single-threaded processor. In alternate implementations, the processor 510 can be a multi-threaded processor. The processor 510 can be further configured to process instructions stored in the memory 520 or on the storage device 530, including receiving or sending information through the input/output device 540. The memory 520 can store information within the system 500. In some implementations, the memory 520 can be a computer-readable medium. In alternate implementations, the memory 520 can be a volatile memory unit. In yet some implementations, the memory 520 can be a non-volatile memory unit. The storage device 530 can be capable of providing mass storage for the system 500. In some implementations, the storage device 530 can be a computer-readable medium. In alternate implementations, the storage device 530 can be a floppy disk device, a hard disk device, an optical disk device, a tape device, non-volatile solid-state memory, or any other type of storage device. The input/output device 540 can be configured to provide input/output operations for the system 500. In some implementations, the input/output device 540 can include a keyboard and/or pointing device. In alternate implementations, the input/output device 540 can include a display unit for displaying graphical user interfaces.

Figure 6:
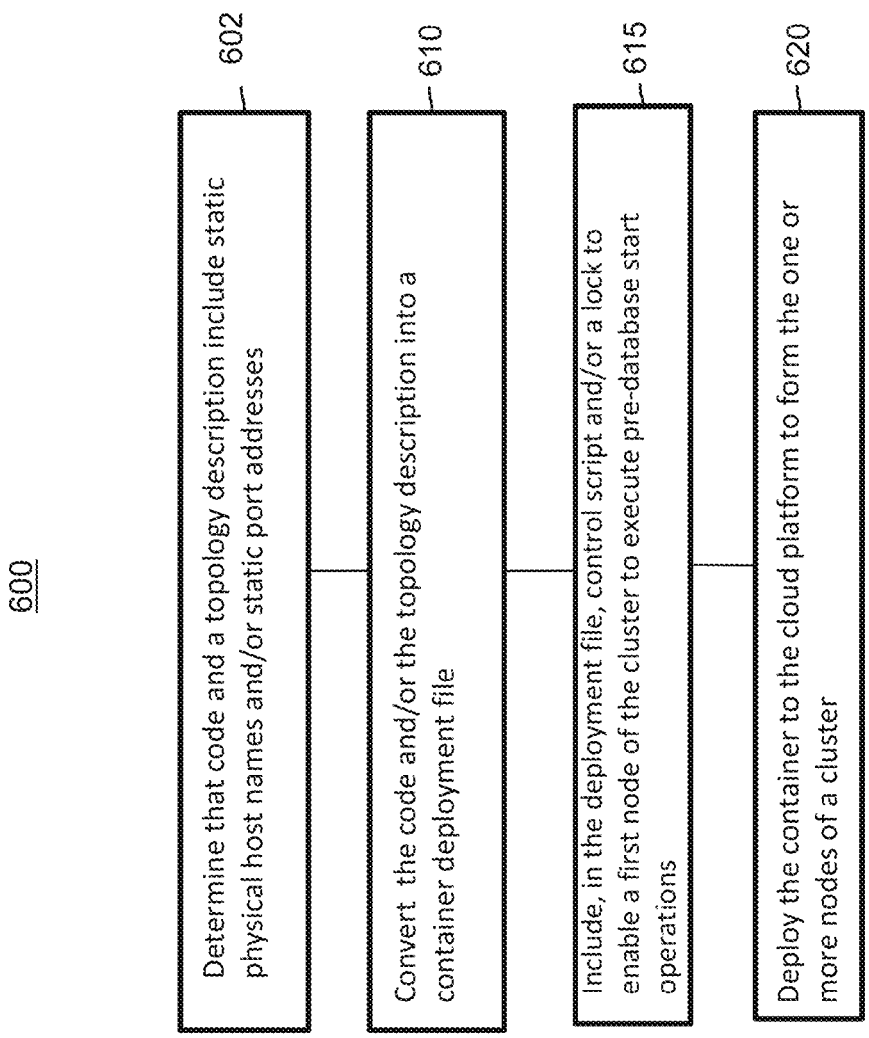
FIG. 6 is an example of a process, in accordance with some implementations of the current subject matter.

FIG. 6 illustrates an exemplary process 600 for deploying containers to form nodes at a cloud platform, according to some implementations of the current subject matter. The description of FIG. 6 also refers to FIG. 1.

At 602, a determination may be made regarding whether a topology description includes static physical host names and/or static port addresses. This determination may also include determining whether code includes static physical host names and/or static port addresses. As noted, when the topology description 114 includes one or more static physical host names and/or one or more static port addresses, the topology description (see, e.g., Table 1) may not be compatible with some cloud platform technologies that rely on an orchestrator to deploy containers. For example, a check may performed to determine whether the compiled code 112 and generated topology description 114 is being deployed to a platform that uses hyperscalers and deployment orchestrators (which do not allow the use of static host naming, static addresses, and/or deploying customized code directly into a single node). If the compiled code 112 and generated topology description 114 are being deployed to such a cloud platform, the compiled code 112 and generated topology description 114 may be further processed at 610-620. For example, the compiled code 112 and generated topology description 114 may be stored at repository 120 (see, e.g., FIG. 1) and converted into a deployment file. If however the compiled code 112 and generated topology description 114 are not being deployed to such a cloud platform (e.g., a cloud platform that does allow the use of static host naming, static addresses, and/or deploying customized code directly into a single node), the compiled code 112 and generated topology description 114 can be deployed directly to the cloud platform and thus by-pass 610-620.

At 610, the code and the topology description may be further processed by at least converting the topology description into a deployment file for a container. For example, in response to determining the topology description includes the static physical host name and the static port address, the topology description may be converted into a deployment file. This conversion may also include converting the code into a deployment file. The deployment file is generated, as noted at 122, by taking into account the roles and functions associated with the nodes of the topology description, but without the static physical host names and/or port addressing used by the topology description. Table 3 above depicts an example of a deployment file.

At 615, a control script (as described above with respect to FIG. 2, for example) and/or a key and lock process (as described above with respect to FIG. 3, for example) may be included in a container. The control script and/or the key and lock process enable the deployment file to be deployed via a plurality of containers, but only a single node will perform pre-start database operations, such as database schema modifications and/or the like.

At 620, the container including the deployment file, the code, and/or the control script may be deployed to the cloud platform to form the one or more nodes of a cluster. The containers, when deployed, start nodes providing the service. For example, user interfaces and corresponding database management systems may be deployed to form nodes based on the containers. Furthermore, the process at FIG. 6 enables a legacy application to be deployed to a more modern cloud infrastructure which does not allow the static host naming and addresses which can be found in these legacy applications. When deployed, the control script and/or the key and lock process limit pre-start database operations, such as database schema modifications, to a single node, despite all of the nodes having the same container.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   determining whether a topology description includes, for at least one node of a plurality of nodes at a cloud platform, a static physical host name and a static port address;
   in response to determining the topology description includes the static physical host name and the static port address, converting at least the topology description into a deployment file that does not use the static physical host name and the static port address, the deployment file enabling deployment to a cloud platform including a hyperscaler and/or a deployment orchestrator that does not allow the use of the static physical host name and the static port address;
   including, in a container, the deployment file, code, and a control script that limits pre-start database operations to a single node of the plurality of nodes of the cloud platform; and
   deploying, the container including the deployment file, the code, and the control script, to the cloud platform to form, at the cloud platform, the plurality of nodes including the single node.

2. The computer-implemented method of claim 1, wherein the determining further comprises determining whether the cloud platform uses the hyperscaler and the deployment orchestrator that do not allow the use of the static physical host name, use of the static port address, and use of the customized code directly into only the single node of the plurality of nodes.

3. The computer-implemented method of claim 2, wherein in response to determining the cloud platform does allow the use of the static physical host name, the static port address, and the customized code, deploying the code and the topology description directly to the cloud platform.

4. The computer-implemented method of claim 3, in response to determining the cloud platform does allow the use of the static physical host name, the static port address, and the customized code, by-passing at least the converting and the including.

5. The computer-implemented method of claim 1, wherein the control script includes a lock and key process to limit the pre-start database operations to the single node of the plurality of nodes.

6. The computer-implemented method of claim 1, wherein the deployment file is configured to be deployed by the deployment orchestrator associated with the cloud platform, wherein the deployment file describes a deployment architecture of a service at the cloud platform, and wherein the deployment file includes one or more roles for each of the plurality of nodes.

7. The method of claim 6, wherein at least one of the plurality of roles provides a user interface for accessing a database management system, and wherein at least one of the plurality of roles provides the database management system.

8. The method of claim 6, wherein the deployment file includes node names for the plurality of nodes to enable a service mesh to provide communications among the plurality of nodes.

9. A system comprising:
   at least one processor; and
   at least one memory including code which when executed by the at least one processor causes operations comprising:

determining whether a topology description includes, for at least one node of a plurality of nodes at a cloud platform, a static physical host name and a static port address;

in response to determining the topology description includes the static physical host name and the static port address, converting at least the topology description into a deployment file that does not use the static physical host name and the static port address, the deployment file enabling deployment to a cloud platform including a hyperscaler and/or a deployment orchestrator that does not allow the use of the static physical host name and the static port address;

including, in a container, the deployment file, code, and a control script that limits pre-start database operations to a single node of the plurality of nodes of the cloud platform; and deploying, the container including the deployment file, the code, and the control script, to the cloud platform to form, at the cloud platform, the plurality of nodes including the single node.

10. The system of claim 9, wherein the determining further comprises determining whether the cloud platform uses the hyperscaler and the deployment orchestrator that do not allow the use of the static physical host name, use of the static port address, and use of the customized code directly into only the single node of the plurality of nodes.

11. The system of claim 10, wherein in response to determining the cloud platform does allow the use of the static physical host name, the static port address, and the customized code, deploying the code and the topology description directly to the cloud platform.

12. The system of claim 11, in response to determining the cloud platform does allow the use of the static physical host name, the static port address, and the customized code, by-passing at least the converting and the including.

13. The system of claim 9, wherein the control script includes a lock and key process to limit the pre-start database operations to the single node of the plurality of nodes.

14. The system of claim 9, wherein the deployment file is configured to be deployed by the deployment orchestrator associated with the cloud platform, wherein the deployment file describes a deployment architecture of a service at the cloud platform, and wherein the deployment file includes one or more roles for each of the plurality of nodes.

15. The system of claim 14, wherein at least one of the plurality of roles provides a user interface for accessing a database management system, and wherein at least one of the plurality of roles provides the database management system.

16. The system of claim 14, wherein the deployment file includes node names for the plurality of nodes to enable a service mesh to provide communications among the plurality of nodes.

17. A non-transitory computer-readable storage medium including code which when executed by at least one processor causes operations comprising:

determining whether a topology description includes, for at least one node of a plurality of nodes at a cloud platform, a static physical host name and a static port address;

in response to determining the topology description includes the static physical host name and the static port address, converting at least the topology description into a deployment file that does not use the static physical host name and the static port address, the deployment file enabling \deployment to a cloud platform including a hyperscaler and/or a deployment orchestrator that does not allow the use of the static physical host name and the static port address;

including, in a container, the deployment file, code, and a control script that limits pre-start database operations to a single node of the plurality of nodes of the cloud platform; and deploying, the container including the deployment file, the code, and the control script, to the cloud platform to form, at the cloud platform, the plurality of nodes including the single node.

* * * * *